United States Patent [19]

Masui et al.

[11] Patent Number: 4,623,584
[45] Date of Patent: Nov. 18, 1986

[54] EXPANDABLE PHENOLIC RESIN-COATED COMPOSITE BEADS, A PROCESS FOR PRODUCTION THEREOF AND A PROCESS FOR MOLDING THEREOF

[75] Inventors: Kodo Masui; Shigetoshi Tanaka; Yoshikazu Kobayashi, all of Nara, Japan

[73] Assignee: Sekisui Kaseihin Kogyo Kabushiki Kaisha, Nara, Japan

[21] Appl. No.: 696,988

[22] Filed: Feb. 1, 1985

[30] Foreign Application Priority Data

Sep. 8, 1984 [JP] Japan .................................. 59-188659

[51] Int. Cl.[4] ...................... B29C 43/18; B29C 67/18; B29C 67/22
[52] U.S. Cl. ................. 428/304.4; 264/45.3; 264/46.4; 264/54; 264/257; 264/259; 264/DIG. 2; 264/DIG. 5; 264/DIG. 6; 264/DIG. 7; 425/127; 425/817 R; 428/313.9; 428/318.4; 428/319.1; 521/54; 521/57; 521/59; 521/136; 523/139; 523/218; 523/219
[58] Field of Search ............... 264/DIG. 7, 45.3, 46.4, 264/DIG. 2, DIG. 6, 257, 259, DIG. 5; 521/57, 59, 136, 139, 218, 219; 425/127, 817 R; 428/406, 313.3, 304.4, 313.9, 318.4, 319.1

[56] References Cited

U.S. PATENT DOCUMENTS

| | | | |
|---|---|---|---|
| 3,746,610 | 7/1973 | Hoegger | 264/DIG. 7 |
| 3,864,206 | 2/1975 | Linderoth | 264/DIG. 7 |
| 4,256,803 | 3/1981 | Savey et al. | 264/DIG. 7 |

Primary Examiner—Philip Anderson
Attorney, Agent, or Firm—Armstrong, Nikaido, Marmelstein & Kubovcik

[57] ABSTRACT

Expandable phenolic resin-coated composite beads comprise an aggregate having coated thereon a solid, expandable resin composition comprising a solid, phenolic resin initial condensation product, a foaming agent and, if necessary, a hardening agent. The expandable phenolic resin-coated composite beads provide composite cellular moldings in which the aggregates are uniformly dispersed in a phenolic resin-expanded layer and are firmly adhered to the expanded layer. The composite cellular moldings can be adhered to a face plate to form integral laminates.

19 Claims, 3 Drawing Figures

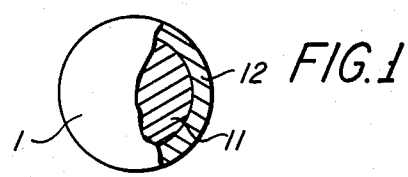
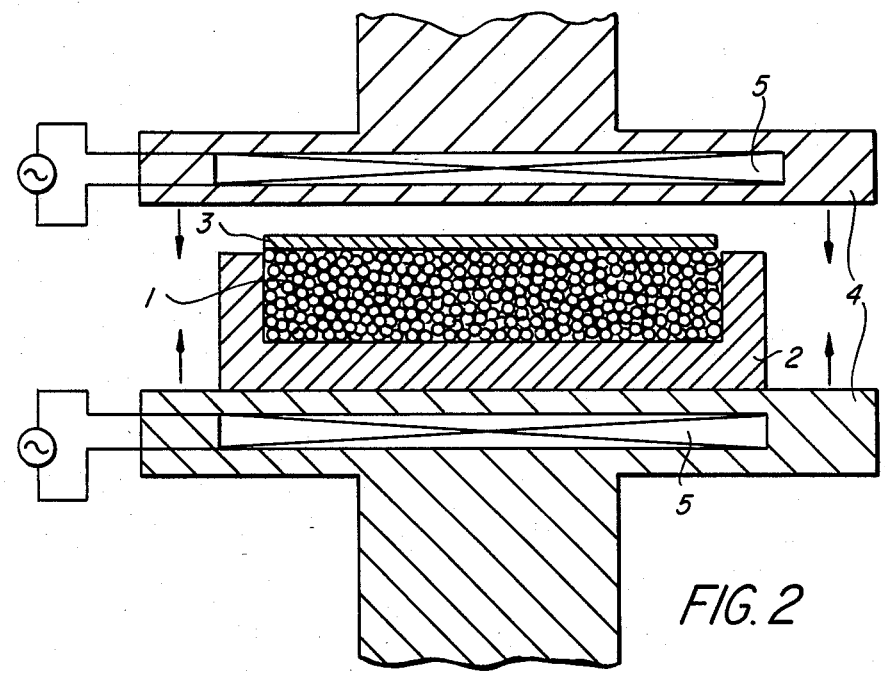
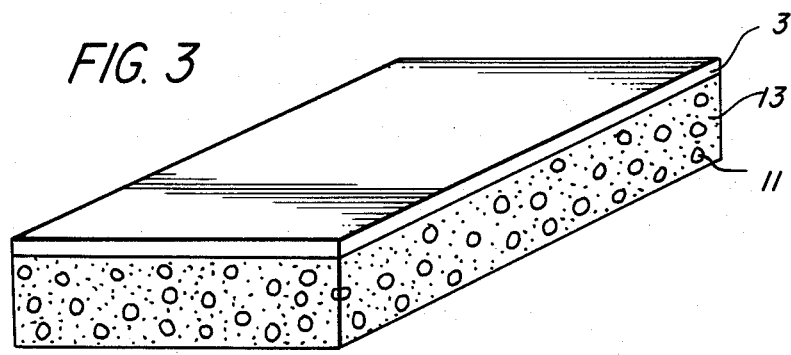

EXPANDABLE PHENOLIC RESIN-COATED COMPOSITE BEADS, A PROCESS FOR PRODUCTION THEREOF AND A PROCESS FOR MOLDING THEREOF

BACKGROUND OF THE INVENTION

1. Field of the Invention

The present invention relates to expandable phenolic resin-coated composite beads which are moldable by heating in a mold, to a process for production thereof and to a process for molding composite molded products by foaming phenolic resins using the composite beads.

2. Description of the Prior Art

An expandable phenolic resin initial condensation product obtained by mixing a novolac type or solid resol type phenolic resin initial condensation product with a desired amount of a foaming agent and, optionally, a hardening agent is usually powdered. The particle size of the powder and the bulk specific gravity are generally greater than 100 mesh and smaller than 1, respectively. In order to obtain a composite molded product by mixing the composition with other aggregates and foaming the mixture by heating, it is required that the size of the aggregates be smaller than 1 mm and their bulk specific gravity be almost the same as that of the aforesaid composition. Otherwise, it is difficult to obtain a homogeneous mixture.

Even though such a mixture is foamable by heating, it is extremely difficult to obtain phenolic resin molding products having a uniform degree of expansion. The reason is because the use of larger aggregates results in confinement of the powdery composition at the lower part of a mold. Bulk specific gravities which are different from each other result in phase separation.

Further, as is disclosed in Japanese Published Examined Patent Application No. 29774/73, it is known that composite molding products of foamed phenolic resins are prepared by filling a mold with inorganic aggregates coated with a liquid, expandable resol type phenolic resin composition and then heat-foaming. However, the aggregates coated with the liquid composition stick to each other so that the fluidizability becomes poor, and an efficient operation of filling the mold becomes difficult. At the same time, filling the mold with a given amount of the composition becomes difficult. In addition, means for transporting the particles with air cannot be used since the respective aggregates stick to each other and do not form independent particles. Furthermore, there are disadvantages that the liquid composition cannot be uniformly coated on each of the aggregates and hardening of the coated composition is initiated at normal temperature. A hardening reaction proceeds at normal temperature with liquid, resol type expandable phenolic resin initial condensation products and even if the products are stored at lower temperatures, the storage is effective only for about 2 months. Additionally, composite molded products prepared by heating the coated aggregates in a mold produces many voids scattered in the phenolic resin-expanded layer, resulting in a non-uniform density.

SUMMARY OF THE INVENTION

The present inventors have investigated to solve the foregoing technical problems in the prior art and as a result have discovered that a composite molded product of a phenolic resin expansion product can be easily obtained by coating aggregates with expandable phenolic resin initial condensation products in a solid state, filling the thus obtained expandable phenolic resin-coated composite beads into a mold and then heating. The invention enables uniform composite molding products to be obtained irrespective of the shape, size and bulk specific gravity of the aggregates.

Therefore, an object of the present invention is to provide solid, expandable phenolic resin-coated composite beads which are capable of foaming with heating in a mold.

Another object of the present invention is to provide solid, expandable phenolic resin-coated composite beads which can be stably stored over long periods of time without causing hardening and can be conveyed by means of air to provide a convenient means of filling a mold.

A further object of the present invention is to provide composite molded products in which aggregates are uniformly dispersed in phenolic resin cellular moldings and are firmly adhered to the phenolic resin composition by foaming with heating in a mold.

A still further object of the present invention is to provide a process for molding the composite molded products.

Still further objects of the present invention are to provide phenolic resin composite cellular moldings integrally laminated onto other face plates by utilizing the adhesive property of the expandable phenolic resin initial condensation products and to provide a process for molding such composite cellular moldings.

A still further object is to provide composite cellular moldings which are highly incombustible by appropriately choosing the aggregates to be included in the moldings.

A still further object of the present invention is to provide composite cellular moldings which have desired characteristics such as heat insulating properties, heat resistant properties, toughness, lightweight properties, etc., by appropriate choice of aggregates.

These cellular moldings can be suitably used as construction materials, heat-insulating plates and the like in architectural applications.

BRIEF DESCRIPTION OF THE DRAWINGS

FIG. 1 is a sectional view of an aggregate according to the present invention.

FIG. 2 is a vertical sectional view of a molding apparatus for preparing a phenolic resin-expanded composite cellular molding having a face plate laminated thereon in accordance with the present invention.

FIG. 3 is a perspective view of a face plate-laminated phenolic resin-expanded cellular molded product as produced in the apparatus of FIG. 2.

DESCRIPTION OF THE PREFERRED EMBODIMENTS

The expandable phenolic resin-coated composite beads of the present invention which are coated with a solid, expandable phenolic resin composition become, upon heating heat-insulating particulate substances which contain the aggregates in the internal portion thereof and are covered with a phenolic resin-expanded layer at the external portion thereof Further, when the composite beads of the present invention are filled into a mold and heated, phenolic resin composite cellular moldings in which the aggregates are uniformly dispersed are obtained. Further, when a face plate is inserted in the mold and the composite beads of the present invention are filled into the mold and heated, a phenolic resin composite cellular molding onto which the face plate is integrally adhered and laminated is obtained.

The solid, phenolic resin initial condensation products which can be employed in the present invention include novolac type and solid resol type phenolic resin initial condensation products.

The terminology "novolac type phenolic resin initial condensation product" is used herein to mean a substance that is obtained by reacting phenols with aldehydes in the presence of an acidic catalyst, i.e., a so-called novolac type phenolic resin conventionally known in the art, which is further polymerizable in the presence of a hardening agent. The initial condensation product is generally powdery at normal, i.e., room, temperature. On the other hand, the terminology "resol type phenolic resin initial condensation product" refers to a substance that is a so-called resol type phenolic resin known in the art obtained by reacting phenols with an excess amount of aldehydes in the presence of a basic catalyst and which is further polymerizable in the presence of an acidic hardening accelerator or by heating. Such a resol type phenolic resin is in a liquid state and contains about 20% of water. The resol type phenolic resin is converted into a powdery resol type phenolic resin useful in the present invention by dehydrating the liquid state resol type phenolic resin (evaporating the moisture off) and then powdering the resulting solid substance (containing about 1% moisture).

Examples of the phenols include, in addition to phenol, 3,5-xylenol, m-cresol, 2,5-xylenol, 3,4-xylenol, 2,4-xylenol, o-cresol, p-cresol, and the like. Examples of the aldehydes include formaldehyde, paraformaldehyde, hexamethylenetetramine, furfural, acetaldehyde, acetals, and the like.

A preferred example of the initial condensation product useful in the present invention is a condensation product of phenol and formaldehyde.

In the present invention, foaming agents of the decomposition type are generally employed. A foaming agent of the decomposition type means an inorganic or organic foaming agent capable of generating gas in the composition containing the phenolic resin initial condensation product upon heating. Representative examples of these foaming agents include organic foaming agents such as N,N'-dinitrosopentamethylenetetraamine, benzenesulfonylhydrazide, azobisisobutyronitrile, azodicarbonamide, p-toluenesulfonylhydrazide, and the like and inorganic foaming agents of the decomposition type such as sodium bicarbonate, ammonium carbonate, ammonium bicarbonate, ammonium nitrite, azide compounds (for example, $CaN_6$), and the like. These foaming agents are all in a powdery state.

In the case of the novolac type phenolic resin initial condensation products, the hardening agent useful in the present invention means a compound that is decomposed upon heating and cross-linkable with the novolac type phenolic resin initial condensation product. Such a compound includes a compound used for forming phenolic resins through reaction with phenols, like formaldehyde, and is generally powdery. Specific examples of such compounds include hexamethylenetetraamine, paraformaldehyde, dimethoxymethane, ethulene glycol methyulene ether, trioxane, tetraoxane, trikmethylolphosphne, s-triazine, and the like. On the other hand, the resol type phenolic resin initial condensation product does not require a hardening agent as used in the aforesaid novolac type, but is hardened only by heating, although strong acids such as phenolsulfonic acid, hydrochloric acid, and the like are sometimes used as accelerators for the acidic hardening.

The amount of the foaming agent to be added is determined mainly depending upon the desired density of the final cellular molded product. However, it is suitable to use 1 to 50 parts by weight, preferably 4 to 8 parts by weight, of the foaming agent based on 100 parts by weight of the phenolic resin initial condensation product.

The amount of the hardening agent to be added is generally 1 to 30 parts by weight, and preferably 4 to 15 parts by weight, based on 100 parts by weight of the novolac type phenolic resin.

Further, a foam controlling agent can be incorporated in the composition to assist in obtaining fine and uniform foams As the foam controlling agent, the use of a surfactant is known. Specific examples of suitable surfactants include non-ionic surfactants such as sorbitan fatty acid esters, silicone glycol copolymers, polyoxyethylene type polyoxypropylene copolymers, and cationic surfactants such as alkyl amines.

The expandable resin composition of the present invention may further contain other additives, for example, fillers such as clay, calcium carbonate, talc, and glass powders. It is preferred that these additives be added in an amount less than 100 parts by weight based on 100 parts by weight of the phenolic resin initial condensation product.

The expandable resin composition of the present invention is used as a powder having an average diameter of less than about 1 mm, generally after mixing the components, i.e., the solid phenolic resin initial condensation product, foaming agent, hardening agent and additives, by merely stirring the respective powders or by kneading the respective powders by means of a heating roll or the like to obtain a uniform mixture and then powdering the mixture.

The aggregates useful in the invention include organic and inorganic particles as well as mixtures thereof. It is preferred that the aggregates are not reactive with the expandable resin composition.

Examples of inorganic aggregates include perlite, sand bar balloons, glass balloons, glass foam particles, glass cotton particles, rock wool particles, slags, foamy clay particles, sand, gypsum particles, and metallic particles.

Specific examples of organic aggregates include synthetic resin particles and expanded particles thereof, wood powder particles, and paper particles. In general, resins having heat resistance against temperatures of 100° C. or higher are preferred. Examples of such resins include expanded particles of styrene-maleic anhydride copolymers and expanded polypropylene particles.

The shape of the aggregates is not particularly limited and can be spherical, crushed fragment-like and amorphous. The size of the aggregates can vary from fine particles having a particle diameter of 0.5 mm to large particles having a particle size of 40 to 50 mm. In the case of aggregates having a small particle diameter, the resin can be applied onto a mass of a plurality of aggregates. The density of the aggregates is not particularly limited. When it is intented to obtain a lightweight cellular molding, aggregates having a density of less than 1 g/cm³ can be used. Aggregates having a higher density may be employed to obtain heavier cellular moldings.

As a process for coating the aggregates with the expandable resin composition, there may be used a process which comprises heating the aggregates to a temperature where the powdery, expandable resin composition will melt and adhere to the aggregates, i.e., in the range of about 70° C. (softening point) to about 120° C. (hardening point), and coating the aggregates with the expandable resin composition in this state, for example by spraying or sprinkling; and a process which comprises coating the expandable resin composition onto the aggregates after heating and softening the expandable resin composition.

Another process involves the use of a binder. As the binder, water, trichlorotrifluoroethane, methyl alcohol, ethyl alcohol, acetone, benzene, toluene, xylene or a mixture thereof may be used. Of these binders, water is most preferred. When these binders are employed, the aggregates and the powdery, expandable resin composition may be rolled and moved together, for example, while spraying the binder in a pan type granulator. In the case of using these binders, it is preferred that the binders be removed, after coating and granulation, in a subsequent drying step. The reason for this is that if water, for example, remains in the coated aggregates, the water sometimes adversely affects the expansion ratio of the foam and the like. As the binder, any binder that does not adversely affect the foaming may be used. For example, a 3 to 5% aqueous solution of sticky polyvinyl alcohol, polyethylene glycol, silicone oil, animal and vegetable oils, may also be used as other binders. When these binders are used, the binders remain in the coated composite beads of the present invention. These coated composite beads are also included within the scope of the present invention as far as the coatings are solid.

The amount of the expandable resin composition for coating the aggregates varies depending upon foamability of the composition, kind and shape of the aggregates, and the like but is generally greater than 5 g per 1000 ml of the bulk volume of the aggregates. A preferred amount for the coating is 15 to 500 g. The more uniformly the aggregates are coated with the composition, the better the coated state. However, in the case of obtaining cellular moldings, the coated state may be non-uniform.

The resin composition for providing the expandable phenolic resin-coated composite beads of the present invention may be a composition that is partially foamed and hardened and has a post expansion property.

The face plate used in the present invnetion may be determined depending upon the desired use of the laminate.

Examples of suitable face plates include plate-like, net-like, non-woven cloth-like, woven cloth-like, foil (or paper)-like and film-like plates. As raw materials for the face plate, there may be used metals such as aluminum, iron, copper; inorganic materials such as glass, calcium silicate, asbestos and cement ; organic and plastic materials such as plywood, excelsior plate, soft urethane, polyvinyl chloride, polypropylene, polyacrylate and polyethylene; and fibrous materials such as cloth. As long as materials adhere to the phenolic resin cellular moldings without any adhesive agent, these materials can be used as the face plates in the present invention.

Specific examples of the foregoing face plates include an aluminum plate, an iron plate, a copper plate, an aluminum foil, an iron foil, a copper foil, a sheet glass, a gypsum plate, a calcium silicate plate, an asbestos plate, a cement plate, a plywood plate, a paper sheet, a soft urethane foam a polyvinyl chloride foam, a polypropylene foam, a polyacrylate foam, a polyethylene foam, a non-woven cloth, glass fiber mat, a metal net, an excelsior plate and the like. Such face plates are generally used in a planar form but the shape may be in a form having curvature of may be pipe-like. For example, when the face plate having such a pipe-like shape is used, it is possible that by melting the phenolic resin-expanded layer and adhering the melt integrally to the circumference of the pipe, a heat-insulating layer is formed to provide a heat-insulating pipe.

The face plate should be thoroughly dried prior to use. If the face plate contains moisture, the phenolic resin foam may be rendered coarse, or the adhesion strength between the face plate and the phenol resin cellular molding may be adversely affected.

In the process for molding according to the present invention, the expandable phenolic resin-coated composite beads of the present invention can be easily converted into composite cellular moldings having optional shapes, as has been described hereinbefore. That is, a given mold is filled with the composite beads in a bulk volume of 20 to 100% and heated at temperatures of 120° to 200° C., preferably 150° to 180° C., whereby the respective beads are foamed, hardened and adhere to each other to give the phenolic resin composite cellular molding. The given mold in this case may be block-like using a box-like mold. A plate-like product may be continuous using a pair of mobile endless belts equipped with a heating means. Means for heating the mold can include steam, hot air, hot press, infrared rays and high frequency.

In another embodiment of the process for molding according to the present invention, the aforesaid expandable phenol resin-coated composite beads are laminated to a face plate having an optional shape which is inserted into a mold, whereby a composite molded product is formed. In this case, the cellular molding is adhered to and laminated on at least a part of the face plate.

The process for molding the expandable phenol resin-coated composite beads and the composite cellular molding of the present invention will be described specifically below with the reference to the drawings.

As is shown in FIG. 1, an expandable phenol resin-coated composite bead (1) is obtained by coating an aggregate (11) with an expandable phenolic resin composition (12). As shown in FIG. 2, a mold (2) which may be coated on the inner surface thereof with a release agent such as a fluorine resin is filled with expandable phenol resin-coated composite beads (1) in bulk volume of generally 20 to 100% preferably 100%. Face plate (3) is put on the composite beads. Then, a hot press is performed under a pressure of 0.1 to 100 kg/cm², particularly 10 kg/cm², in the direction of the arrow to effect foaming and molding, while heating at a determined temperature (at a temperature higher than the softening point, for example, 150° to 180° C.) using heater (5) which is built into press heating plate (4). In the thus obtained laminate composite cellular molding, aggregates (11) are substantially uniformly dispersed in a phenolic resin cellular molding (13) and further integrally adhered to face place (3), as shown in FIG. 3.

The aforesaid mold for molding may be, for example, a pair of a male mold and a female mold. In this case, the face plate is mounted to the male mold and the female mold is so constructed that the expandable resin-coated composite beads are added to the female mold between the female mold and the male mold so as to provide a desired thickness. Then, the female mold is closed followed by treatment as described above.

In the thus obtained face plate-laminated phenolic resin composite cellular molding, the aggregates are substantially uniformly dispersed in the composite cellular molding, unlike the composite cellular molding in which the expandable resin composition and aggregates are separately mixed and then foamed. The term "molding in which the aggregates are substantially uniformly dispersed" as used herein means that the aggregates are not confined only at the surface or at the center of the molding. For this reason, such a molding has various characteristics such as high dimensional stability, uniform heat-insulating effect, and the like. Further, it is observed that the aggregates are substantially uniformly dispersed in the composite cellular molding even at a low filling rate of 20% in bulk volume. This is one of the surprising findings made by the present inventors. In addition, such a composite cellular molding firmly adheres to a face plate and provides a product that is highly utilizable as a construction material, by choosing the kind and shape of the face plate.

The laminate composite cellular molding in accordance with the process of the present invention comprises the resin cellular molding having aggregates uniformly dispersed therein and a face plate integrally adhered thereto. Accordingly, if the molding is plate-like, the plate can be used as a heat-insulating board such as a door or architectural panel. If the molding is cylindrical, it can be used as a heat-insulating pipe in which the pipe per se is the face plate. Further if an iron or steel board finished in various shapes is used as the face plate, an excellent product useful for, e.g., a folded steel board, can be obtained. Further, the molding is extremely light weight and has excellent adhesion to other materials and, therefore, is also suited for composite molding for sizing boards, etc.

Next the present invention will be described with reference to examples and comparison examples but is not deemed to be limited thereto.

EXAMPLE 1

To 100 parts by weight of a novolac type phenol-formaldehyde resin powder were added 5 parts by weight of a foaming agent, dinitrosopentamethylene tetraamine, 10 parts by weight of a hardening agent, hexamethylene tetraamine, and 1 part by weight of a foam controlling agent, polyoxyethylene sorbitan monostearate. The mixture was kneaded with a heating roll. Thereafter, the mixture was powdered to obtain a powdery expandable resin composition. The expandable resin composition was a powder, 0.5% of which remained on a 100 mesh screen. The softening point was 81° C. and the gelation time at 150° C. was 76 seconds.

Then, the above-described powdery resin composition was granulated for 3 minutes with a pan type granulator, using as aggregates spherical multi-foam resol type phenolformaldehyde resin having a mean grain diameter of 5.0 mm. In this case, water was used as a binder and sprayed in a mist state through a nozzle. The ratio of raw materials in the granulation was about 3 cc of the binder and 40 g of the aforesaid powdery resin composition based on 200 cc (bulk) of the aggregates.

Next, the coated composite beads obtained at this step were air-dried overnight and then dried for 6 hours in a hot air circulation type oven at 70° C.

The thus obtained coated composite beads had the powdery expandable resin composition fixed to the aggregates at the surface thereof. Even though the composite beads were roughly handled, no delamination occurred. The coating was not completely foamed and had a mean thickness of 0.27 mm.

Then, the coated composite beads were put on talc powders and allowed to foam and harden for 30 minutes in a hot air circulation type oven at 160° C.

The thus obtained composite cellular moldings were spheres tinged with a yellow color, having a particle diameter of 10 to 14 mm and having a skin at the surface thereof. Each molding was a composite cellular sphere in which resol type phenolic resin-expanded particles were present at the internal portion (aggregates) and an expanded layer of novolac type phenolic resin having a dense foam structure was present at the external portion.

Next, a metal mold (220×220×25 mm) was filled with the coated composite cellular spheres in almost full bulk volume (100%). The mold was closed and maintained in a hot air circulation type oven at 160° C. Thereafter, the mold was withdrawn from the thermostat and, the resultant composite cellular molding was taken out from the mold.

The thus obtained composite cellular molding was a novolac type phenolic resin composite cellular molding in which the novolac type phenolic resin-expanded layer at the surface of the composite molding spheres was further foamed, i.e., expanded to fully fill up all of the voids formed between the spheres to completely bind the spheres, resulting in uniformly dispersed aggregates (resol type phenolic resin cellular particles). For reference, the density of the molding was 350 kg/m³. Further, the above-described composite cellular spheres were filled up in a metallic mold to a bulk volume of 30% followed by heating and molding. The resulting molding was a composite cellular molding in which the aggregates were uniformly dispersed and in which the voids between the spheres were filled up with the novolac type phenolic resin-expanded material expanded to a high ratio. The density was 100 kg/m³.

EXAMPLES 2, 3 AND 4

Other examples in which coating of an aggregate was conducted using water as the binder are shown in Table 1 (which also includes Example 1). The ratio of raw materials used in the coating step was the same as in Example 1.

TABLE 1

| Example | Aggregate | Condition for Drying and State | Thickness of Coating | Particle Diameter and State after Secondary Heating |
|---|---|---|---|---|
| 1 | resol type phenol resin spherical multi-foam (5.0 mmφ in | air-dried overnight → dried at 70° C. for 6 hrs. The thus obtained resin powders were melt-adhered to form a | 0.27 in average | composite cellular molding spheres of 10–14 mmφ, having the skin at the surface, and covered with the expanded |

TABLE 1-continued

| Example | Aggregate | Condition for Drying and State | Thickness of Coating | Particle Diameter and State after Secondary Heating |
|---|---|---|---|---|
| 2 | average) expanded glass (15 mmφ) | coating air-dried overnight → dried at 60° C. for 2 hrs. The thus obtained resin powders were melt-adhered to form a coating. | 0.08 in average | layer of a dense foam structure composite cellular molding spheres of 3-4 mmφ, having the skin at the surface, and covered by the expanded layer of a dense foam structure |
| 3 | perlite (5.3 mmφ in average) (trademark, Fuyolite, made by Fuyolite Industry Co., Ltd.) | air-dried overnight heated in talc at 110° C. for 2 hrs. The resin powders melted and the melt formed a thin surface coating. | 0.22 in average | composite cellular molding spheres of 13 mmφ in a mean sphere diameter, having the skin at the surface, and covered by the expanded layer of a dense foam structure |
| 4 | expanded glass (3.7 mmφ) (trademark, Cellobeads, made by Toyota Spinning Co., Ltd.) | air-dried overnight. The thus dried resin powders were adhered. Rough handling resulted in scarping the coating off. | 0.2 in average | composite cellular molding spheres of 5-7 mmφ, having the skin at the surface, and covered by the expanded layer of a light brown color in which coarse foam was scattered. |

Binder: water
Secondary heating: 160° C., 30 minutes, on talc

EXAMPLE 5

A powdery, expandable resin composition was prepared in the manner described in Example 1. Then, the above-described powdery resin composition was granulated with a pan type granulator using as aggregates expanded glass (trademark: Cellobeads, made by Toyoda Spinning Co., Ltd.) having a mean particle diameter of 3.7 mm. In this case, a mixture of methyl alcohol (reagent special grade) and trichlorotrifluoroethane in a volume ratio of 1:5 was used as a binder and sprayed in a mist state through a nozzle. The ratio of raw materials in the granulation was about 3 cc of the binder and 40 g of a novolac type, powdery resin composition based on 200 cc (bulk) of the aggregates.

Next, the resultant coated composite beads were air-dried overnight and then dried for 72 hours in a hot air circulation type oven at 40° C. The thus obtained coated composite beads were in a state where the powdery, expandable resin composition melted and the melt adhered, as a thin layer, to the surface of the aggregates (expanded glass beads), whereby the powders completely melted and solidified. Even though the coating was roughly handled, no delamination occurred. The coating had a mean thickness of 0.15 mm.

Then, the coated composite beads were put on talc and were allowed to foam and harden for 30 minutes in a hot air circulation type oven at 160° C.

The thus obtained cellular molding was a spherical, novolac type phenolic resin composite cellular molding tinged with yellow color, having a particle diameter of 8 to 10 mm, having a skin at the surface thereof and having an expanded layer of a dense foam structure covering the glass bead.

EXAMPLES 6, 7 AND 8

Other examples in which the granulation was conducted using methyl alcohol and trichlorotrifluoroethane (F113) as binders are shown in Table 2 (which includes Example 5). The ratios of raw materials upon coating were all identical.

TABLE 2

| Example | Aggregate | Binder (ratio) | Condition for Drying and State | Thickness of Coating | Particle Diameter and State after Secondary Heating |
|---|---|---|---|---|---|
| 5 | expanded glass (3.7 mmφ) | methyl alcohol:F 113 (1:5) | After air-drying overnight, dried at 40° C. for 72 hrs. The resin powders melted and adhered as a thin layer and solidified to form a thin layer. | 0.15 in average | composite cellular molding spheres of 8-10 mmφ, having the skin at the surface, and covered by the expanded layer of a dense foam structure |
| 6 | expanded glass (1.5 mmφ) | methyl alcohol:F 113 (1:1) | After air-drying overnight, dried at 55° C. for 72 hours. After the resin powders melted, it was difficult to discipitate the binder during drying. Foaming resulted in presence of coarse foam, which resulted in turn in a surface layer in a broken state. | 0.4-1.2 | composite cellular molding spheres in uneven shape of 4-7 mmφ, having the non-uniformly expanded layer in which coarse foams are present. |
| 7 | perlite (5.3 mmφ in average) | ethyl alcohol | In granulation, the resin mixture rapidly melted to render uniform granulation somewhat difficult. After air-drying overnight and then drying at 55° C. for 72 hrs., the resin powders melted and the resulting thin layer was firmly adhered to the aggregates and solidified to form a coating. | 0.21 in average | composite cellular molding spheres of 10 mmφ in mean diameter, having the skin at the surface and, covered by the light brown, expanded layer of a coarse foam structure in which coarse foams are present. |
| 8 | expanded glass | F 113 | The binder had no solubility in the resin powders so that the powders were | — | — |

TABLE 2-continued

| Example | Aggregate | Binder (ratio) | Condition for Drying and State | Thickness of Coating | Particle Diameter and State after Secondary Heating |
| --- | --- | --- | --- | --- | --- |
| | (3.7 mmφ) | | delaminated by air-drying after granulation. | | |

Binder: methyl alcohol and trichlorotrifluoroethane (F 113) or a mixture thereof
Secondary heating: 160° C., 30 minutes, on talc

EXAMPLE 9

A powdery, expandable resin composition was prepared in the manner described in Example 1.

Then, the above-described powdery resin composition was granulated in a pan type granulator using as aggregates expanded glass beads having a mean grain diameter of 3.7 mm.

In this case, polyethylene glycol having a molecular weight of 190 to 210 was used as a binder and was sprayed through a nozzle. The ratio of raw materials in the granulation was about 5 cc of the binder and 40 g of a powdery novolac type phenolic resin composition based on 200 cc (bulk) of the aggregates.

Next, the coated composite beads obtained in the above step were settled for 24 hours.

The thus obtained coated composite beads comprised the powdery, expandable resin composition adhered to the surface of the aggregates (expanded glass beads) by means of the binder. Even though the coating was roughly handled, no delamination occurred.

The coating had a mean thickness of 0.22 mm.

Then, the coated composite beads were put on talc powder and were allowed to foam and harden for 30 minutes in a hot air circulation type oven at 160° C.

The thus obtained composite cellular moldings were spherical, novolac type phenolic resin composite cellular moldings having a yellow tint, having a particle diameter of 6 to 9 mm, having the skin at the surface thereof and being covered with the expanded layer, the expanded glass beads forming the internal portion thereof.

EXAMPLE 10

A powdery, resin composition was prepared in the manner described in Example 1.

Then, expanded glass beads having a mean particle diameter of 3.7 mm were heated for 2 hours in a hot air circulation type oven at 180° C. The heated glass beads were immediately withdrawn from the oven, the glass was poured in the above-described powdery resin composition heated in a pan type granulator, which had been previously regulated to an atmosphere of 60° C., thus effecting coating.

The ratio of raw materials in the coating was 40 g of powdery resin composition based on 200 cc (bulk) of the expanded glass beads as the aggregates.

The thus obtained coated composite beads were such that the powdery expandable resin composition was adhered as a melt onto the surface of the aggregates, thereby forming a coating as a uniform thin layer. Even though the coating was roughly handled, no delamination occurred. The coating had a mean thickness of 0.15 mm.

Then, the coated composite beads were put on talc powder and allowed to foam and harden for 30 minutes in a hot air circulation type oven at 160° C.

The thus obtained composite cellular moldings were novolac type phenolic resin composite cellular molding spheres tinged with a yellow color, having a particle diameter of 8 to 10 mm, having a skin at the surface thereof and being covered with an expanded layer of a dense foam structure, the expanded glass beads being present as the internal portion thereof.

EXAMPLE 11

100 parts by weight of a powdery resol type phenolic resin having a softening point of 73° C. were mixed with 10 parts by weight of a foaming agent, dinitrosopentamethylene tetraamine, and 1 part by weight of a foam controlling agent, polyoxyethylenesorbitan monostearate, in a flow of 70 to 100 mm at 125° and a gelation time of 85 to 105 seconds at 150° C. Thus, a powdery, expandable resol type phenolic resin composition was obtained.

Then, the above-described powdery resin composition was granulated for 3 minutes with a pan type granulator using as aggregates spherical multi-foam resol type phenolic resin having a mean particle diameter of 5.0 mm. In this case, methyl alcohol (reagent special grade) was used as a binder and sprayed as a mist through a nozzle.

The ratio of raw materials in the granulation was 8 cc of the binder and 43 g of the powdery, resol type phenolic resin composition based on 1000 cc (bulk) of the aggregates.

Next, the coated composite beads thus obtained were air-dried overnight and then dried for 3 hours in a hot air circulation type oven at 50° C.

The thus obtained coated composite beads comprised the powdery expandable resin composition as a dark brown melt fused as a thin layer to the aggregates at the surface thereof. Even though the powders were roughly handled no delamination occurred. The coating was not completely foamed and had a mean thickness of 56 microns.

Next, the coated composite beads were placed on talc powder followed by foaming and hardening for 30 minutes in a hot air circulation type oven at 160° C.

The thus obtained composite cellular moldings were yellow brown composite cellular molding spheres having a particle diameter of 6 to 9 mm, having a skin at the surface thereof. The resol type phenolic resin-expanded particles formed the internal portion (aggregates) of the spheres and the resol type phenolic resin-expanded layer formed a dense foam structure as the external portion, i.e., layer, of the spheres.

Next, the coated composite cellular molding spheres were almost fully (100% by a bulk volume) filled into a metallic mold (220×220×25 mm). After the mold was closed, the system was maintained for 1 hour in a hot air circulation type oven at 160° C. Thereafter, the mold was withdrawn from the oven and the composite cellular molding was taken out of the mold.

The thus obtained composite cellular molding was a resol type phenolic resin composite cellular molding in which the powdery resol type phenolic resin-expanded layer present at the surface of the spherical composite moldings was further foamed thereby filling the cavities between the spheres with the resol type phenolic resin-expanded material which had a dense foam structure, the aggregates (resol type phenol resin-expanded beads) being uniformly dispersed in the molding. For reference, the density of the molding was 200 kg/m³.

The above-described composite cellular molding spheres were also placed in the metallic mold in a bulk volume of 50% followed by heating and molding. The obtained molding also had the aggregates uniformly dispersed therein. The product was a molding in which the cavities between the beads were filled with the resol type phenol resin-expanded composition which was tinted with a yellow dark brown color and which had been foamed to a high expansion ratio and had a dense foam structure. The density was 100 kg/m³.

EXAMPLES 11, 12, 13 AND 14

Other examples in which methyl alcohol and trichlorofluoroethane (F113) were used as binders are shown in Table 3 (which includes Example 11).

The ratios of raw materials in the coating were all identical with Example 11.

granulator. In this case, water was used as a binder and sprayed as a mist through a nozzle.

The ratio of the raw materials in the coating was about 10 cc of the binder and 43 g of a powdery resol type phenolic resin composition based on 1000 cc (bulk) of the aggregates.

Next, the coated composite beads were air-dried overnight and then dried for 4 hours in a hot air circulation type oven at 65° C.

The thus obtained coated composite beads comprised the powdery expandable resin composition bound to the surface of the aggregates (expanded glass beads). Even though the beads were roughly treated, no delamination occurred. The coating was not fully foamed and had a mean thickness of 80 microns.

Next, the coated composite beads were placed on talc powder and foamed and hardened for 30 minutes in a hot air circulation type oven at 160° C.

The thus obtained composite cellular moldings were resol type phenolic resin composite cellular molding spheres tinged with a yellow dark brown color, having a particle diameter of 5 to 8 mm, having a skin at the

TABLE 3

| Example | Aggregate | Binder (ratio) | Condition for Drying and State | Thickness of Coating | Particle Diameter and State after Secondary Heating |
|---|---|---|---|---|---|
| 11 | resol type phenol resin spherical multi-foam (50 mmφ in average) | methyl alcohol:F 113 (1:5) | After air-drying overnight and drying at 50° C. for 3 hrs., the resin powders melted and adhered as a thin layer which was solidified to form a coating. | 58µ in average | composite cellular molding spheres of 6-9 mmφ, having the skin at the surface and, covered by the expanded layer of a dense foam structure |
| 12 | expanded glass (1.5 mmφ) | methyl alcohol:F 113 (1:1) | After air-drying overnight and drying at 60° C. for 3 hrs., the resin powders melted. During the drying, it was difficult to discipitate the binder. Foaming resulted in presence of coarse foams, which resulted in turn in a surface coating in a broken state. | 85-260µ | composite cellular molding spheres in an uneven shape of 6-9 mmφ, in which coarse foams are present. |
| 13 | perlite (5.3 mmφ in average) | ethyl alcohol | In granulation, the resin mixture rapidly melted to render uniform granulation somewhat difficult. After air-drying overnight and drying at 55° C. for 72 hrs., the resin powders melted and the resulting thin layer was firmly adhered to the aggregates and solidified to form a coating. | 70µ in average | composite cellular molding spheres of 10 mmφ in mean particle size, having the skin at the surface and, covered by the light brown expanded layer of a coarse foam structure in which coarse foams are present. |
| 14 | expanded glass (3.7 mmφ) | F 113 | The binder had no solubility in the resin powders so that the powders were delaminated by air-drying after granulation. | — | — |

Binder: methyl alcohol and trichlorotrifluoroethane (F 113) or a mixture thereof
Secondary heating: 160° C., 30 minutes, on talc

EXAMPLE 15

A powdery, expandable resin composition was prepared in the manner described in Example 11.

Then, the powdery, expandable resin composition was coated onto expanded glass (trademark, Cellobeads, made by Toyoda Spinning Co., Ltd.) having a mean particle size of 3.7 mm, by means of a pan type surface thereof and having an expanded layer of a dense foam structure covering the expanded glass beads.

EXAMPLES 16, 17 AND 18

Other examples in which coating was conducted using water as a binder are shown in Table 4 (which includes Example 15). The ratios of raw materials in the coating were all identical with Example 15.

TABLE 4

| Example | Aggregate | Condition for Drying and State | Thickness of Coating | Particle Diameter and State after Secondary Heating |
|---|---|---|---|---|
| 15 | expanded glass (3.7 mmφ in average) | air-dried overnight and then at 65° C. for 4 hrs. The so dried resin powders melted to form a coating | 80µ in average | composite cellular molding spheres of 5-8 mmφ, having the skin at the surface and, covered by the expanded layer of a dense foam structure. |
| 16 | expanded glass | air-dried overnight then dried at 50° C. for 2 hrs. The | 125µ in average | composite cellular molding spheres of 3-4 mmφ, having the skin at the |

TABLE 4-continued

| Example | Aggregate | Condition for Drying and State | Thickness of Coating | Particle Diameter and State after Secondary Heating |
|---|---|---|---|---|
| | (1.5 mmφ) | so dried resin powders melted to form a coating. | | surface and, covered by the expanded layer in a state where pinholes are scattered in the dense foam structure. |
| 17 | perlite (5.3 mmφ in average) (trademark, Fuyolite, made by Fuyolite Ind.) | air-dried overnight and then heated at 110° C. for 2 hrs. on talc. The resin powders melted to form a thin surface coating. | 160μ in average | composite cellular molding spheres of 9 mmφ in mean sphere size, having the skin at the surface and covered by the expanded layer of a dense foam structure |
| 18 | expanded glass (3.7 mmφ) (trademark, Cellobeads, made by Toyota Spinning) | air-dried overnight; The so dried resin powders were adhered. Rough handling resulted in scraping the coating off. | 60μ in average | composite cellular molding spheres of 7-9 mmφ, having the skin at the surface, and covered by the dark brown, expanded layer of a coarse foam structure in which large foams are present. |

Binder: water
Secondary heating: 160° C., 30 minutes, on talc

EXAMPLE 19

A powdery, expandable resin composition was prepared in the manner described in Example 11.

Then, the powdery resin composition was coated for 3 minutes using a pan type granulator onto expanded glass beads having a mean particle diameter of 3.7 mm.

In this case, polyethylene glycol having a molecular weight of 190 to 200 was used as a binder and was sprayed through a nozzle. The ratio of raw materials in the granulation was 10 cc of the binder and 43 g of the powdery resol type phenolic resin composition per 1000 cc (bulk) of the aggregates.

Next, the coated composite beads obtained at this step were settled for 24 hours.

The thus obtained coated composite beads had the powdery, expandable resin composition adhered to the surface of the aggregates by the presence of the binder. Even though the beads were roughly handled, no delamination occurred.

The coating had a mean thickness of 55.

Then, the coated composite beads were put on talc powder and were allowed to foam and harden for 30 minutes in a hot air circulation type oven at 160° C.

The obtained cellular moldings were spherical resol type phenolic resin composite cellular molding spheres tinged with a brown color, having a particle diameter of 6 to 9 mm, having a skin at the surface thereof and having an expanded layer covering the expanded glass beads.

EXAMPLE 20

A powdery, expandable resin composition was prepared in the manner described in Example 11.

Then, expanded glass beads having a bead diameter of 3.7 mm were heated for 2 hours in a hot air circulation type oven at 180° C. The glass beads were immediately withdrawn from the oven and poured into the aforesaid powdery resin composition which had been heated in a pan type granulator previously regulated at 60° C., thereby to effect coating.

The ratio of the raw materials in the coating was 43 g of the powdery, resol resin composition per 1000 cc (bulk) of the aggregates.

The obtained coated composite beads had the powdery, expandable resin composition fused as a melt to the surface of the aggregates (expanded glass) to form a thin layer. Even though the coating was roughly handled, no delamination occurred. The coating had a mean thickness of 45 microns.

Then, the coated composite beads were put on talc powder and were allowed to foam and harden for 30 minutes in a hot air circulation type oven at 160° C.

The obtained cellular moldings were resol type phenolic resin composite cellular molding spheres tinged with a yellow dark brown color, having a particle diameter of 6 to 9 mm, having a skin at the surface thereof and being covered by an expanded layer of dense foam structure in which the expanded glass beads formed the internal portion.

EXAMPLE 21

To 100 parts by weight of novolac type phenol-formaldehyde resin powder were added 10 parts by weight of a foaming agent, dinitrosopentamethylene tetraamine, 10 parts by weight of a hardening agent, hexamethylene tetraamine, and 1 part by weight of a foam controlling agent, polyoxyethylene sorbitan monostearate. The mixture was kneaded with a heating roll. Thereafter, the mixture was powdered to obtain a powdery resin composition. This expandable resin composition was a powder which remained by 2.4% through a 150 mesh. The softening point was about 80° C. The gelation time at 150° C. was 76 seconds.

The above-described powdery resin composition was granulated for 3 minutes with a pan type granulator, using as aggregates, perlite (trademark, Fuyolite, made by Fuyolite Industry Co., Ltd.) having a mean particle diameter of 5.3 mm. In this case, water was used as a binder and sprayed as a mist through a nozzle. The ratio of raw materials in the granulation was about 10 cc of the binder and 43 g of the novolac type, powdery resin composition based on 100 cc (bulk) of the aggregates.

Next, the coated composite beads were air-dried overnight and then dried for 6 hours in a hot air circulation type oven at 70° C.

In the thus obtained coated composite beads, the powdery, expandable resin composition was fixed to the aggregates (perlite) at the surface thereof. Even though the composite was roughly handled in a solidified state after melting, no delamination occurred. The coating was not completely foamed and had a mean thickness of 80 microns.

The coated composite beads were almost fully (100% by a bulk volume) filled up in a metallic mold (250×250×25 mm) that had been subjected to a coating treatment using a mold release agent (trademark: Toshiba Silicone TSM 650 and YG 6144), and an aluminum board (250×250×0.5 mm) was put thereon. After the mold was closed, heating was performed at a temperature of 150° C. for 20 minutes under a pressure of 10 kg/cm² from the upper and lower sides using a press heating plate.

After completion of the heating, the press heating plate was opened and, the face plate-laminated phenol resin composite cellular molding was withdrawn from the mold. The thus obtained molding comprised the aluminum board completely adhered to the surface thereof and the novolac type phenol resin-expanded layer with the aggregates uniformly dispersed therein.

The delamination strength of the aluminum board from the thus obtained laminate molding was 1.15 kg/cm².

EXAMPLES 22 TO 34

Various plate-synthetic resin composite cellular molding laminates were obtained in a manner similar to Example 1 except that the face plate was changed. The results are shown in Table. 5.

TABLE 5

| Example | Face Plate | Thickness (mm) | Adhesion | Delamination Strength (kg/cm²) | Note |
|---|---|---|---|---|---|
| 21 | aluminum board | 0.5 | ⊚ | 1.15 | good adhesion |
| 22 | iron plate | 0.3 | ⊚ | 1.12 | " |
| 23 | copper plate | 0.3 | ⊚ | 1.08 | " |
| 24 | sheet glass | 3.0 | ⊚ | 0.99 | " |
| 25 | gypsum plate | 6.0 | ⊚ | 1.26 | gypsum plate was destroyed. |
| 26 | calcium silicate plate | 6.0 | ⊚ | 1.18 | good adhesion |
| 27 | flexible plate | 6.0 | ⊚ | 1.22 | " |
| 28 | cement plate | 20 | ⊚ | 1.16 | " |
| 29 | plywood plate | 4 | ⊚ | 1.22 | " |
| 30 | paper | 0.1 | ⊚ | 1.40 | " |
| 31 | soft urethane foam | 10 | ⊚ | 0.68 | urethane was destroyed. |
| 32 | gypsum plate | 6.0 | ⊚ | 0.27 | Foam in the phenol layer was coarse. |
| 33 | flexible plate | 6.0 | o | 0.34 | Foam in the phenol layer was coarse. |
| 34 | plywood plate | 4.0 | o | 0.37 | Foam in the phenol layer was coarse. |

In the table, ⊚ and indicate very strong adhesion and strong adhesion, respectively.

The measurement of delamination strength was conducted under the following conditions:
Test piece: thickness of original plate×40 (width)×50 (length) mm;
Test speed 5 mm/min;
Device: tensile tester (JIS K-6767-B method); for adhesion to the device, Esdain 3000 A and B were used.

The face plates used in Examples 25, 26, 27, 28 and 29 were dried at 110° C. for 2 hours in a hot air circulation thermostat prior to the formation of the laminates. In Examples 32, 33 and 34, such a drying treatment as described above was not performed.

In the face plate-laminated composite cellular moldings prepared in the above examples, the face plates were strongly fused with the phenol resin composite cellular moldings so that even though delamination of the composite cellular molding portions from the face plate portions was attempted, no full delamination occurred but instead these portions were strongly fused in such a manner that the face plates were destroyed.

In the case where the face plates subjected to no drying treatment were used, delamination strength (adhesion strength) was reduced to 20-30% as compared to the cases in which the drying treatment was performed. In addition, a good foam density of 1/10 to 1/20 mm (good) was obtained with the phenol resin-expanded layer in Examples 25, 27 and 29 whereas the foam became coarse in Examples 32, 33 and 34 using the same face plates (not subjected to the drying treatment), showing a foam density of 1 to 2 mm.

COMPARISON EXAMPLE

To 100 parts by weight of a viscous, liquid, resol type phenol-formaldehyde resin (resin content, 81.0%; viscosity, 66 poise (25° C.); specific gravity, 1.262; gelation time, 170 seconds (150° C.)) were added 3 parts by weight of a foam controlling agent, polyoxyethylene sorbitan monostearate. After the mixture was mixed, 20 parts by weight of a foaming agent, trichloromonofluoromethane, and 10 parts by weight of trichlorotrifluoroethane were added followed by mixing.

After the mixture was mixed, 10 parts by weight of an aqueous solution of a hardening agent, phenolsulfonic acid (purity 67%), were mixed with the mixture at a high speed to obtain a resin mixture.

Then, the above-mentioned resin composition was mixed with perlite having a mean particle diameter of 5.3 mm as an aggregate to coat the resin composition onto the surface of the aggregates. The ratio of the raw materials was 45 g of the resol type phenol resin composition to 200 cc of the aggregates.

In the above procedure, the coating operation proceeded only with extreme difficulty because the above-mentioned resin composition was viscous. Accordingly, a uniform coating was not obtained and the resin composition formed an uneven layer on the surface of the aggregates, where partially resin-rich portions and partially resin-poor portions were scattered over wide areas. The beads adhered to one another and showed no fluidizability. To complete the coating in such a state, it took about 10 minutes.

The thus coated aggregates were immediately filled into a metallic mold at a bulk volume of almost 100%. After the mold was closed, molding was carried out by heating in a hot-air circulation type oven at 85° C.

The composite was a molding having a bulk specific gravity of 0.12 g/cc, which was tinged with a red brown color.

However, in the molding, voids free of phenolic foam occupied 50% of the total space and the cavities formed between the aggregates failed to fully fill up with the phenol-expanded layer, although the aggregates were adhered to each other by a phenolic foam having an extremely low expansion ratio.

While the invention has been described in detail and with reference to specific embodiments thereof, it will be apparent to one skilled in the art that various changes and modifications can be made therein without departing from the spirit and scope thereof.

What is claimed is:

1. An expandable phenolic resin-coated composite bead which comprises an aggregate coated with a solid, expandable resin composition comprising a solid, phenolic resin initial condensation product and a foaming agent.

2. The expandable phenolic resin-coated composite bead of claim 1 wherein said solid, expandable resin composition is coated in an amount of at least 5 g based on 1000 ml by bulk volume of said aggregate.

3. The expandable phenolic resin-coated composite bead of claim 1 wherein said solid, expandable resin composition is coated in an amount of 15 to 500 g based on 1000 ml by bulk volume of said aggregate.

4. The expandable phenolic resin-coated composite bead of claim 1 wherein said aggregate is selected from organic beads and inorganic beads.

5. The expandable phenolic resin-coated composite bead of claim 1 wherein said aggregate has a mean particle diameter of 0.5 mm to 50 mm.

6. A process for producing expandable phenolic resin-coated composite beads which comprises coating an aggregate with a solid, expandable resin composition using a binder, said resin composition comprising a solid, phenolic resin initial condensation product and a foaming agent.

7. The process of claim 6 wherein said binder is selected from water, methyl alcohol, ethyl alcohol, acetone, benzene, xylene and mixtures thereof.

8. The process of claim 7 wherein said binder is removed from the coated aggregate.

9. The process of claim 6 wherein said binder is a solution selected from aqueous solutions of polyvinyl alcohol, polyethylene glycol, silicone oil, animal oils and vegetable oils.

10. A process for producing expandable phenol resin-coated composite beads which comprises heating an aggregate and bringing the heated aggregate into contact with a powdery, expandable thermoplastic resin composition which comprises a solid, phenolic resin initial condensation product and a foaming agent.

11. The process of claim 10 wherein said aggregate is heated to a temperature in the range of 70° to 300° C.

12. A process for molding expandable phenol resin-coated composite beads which comprises coating an aggregate with a solid, expandable resin composition comprising a solid, phenolic resin initial condensation product and a foaming agent to form expandable phenolic resin-coated beads, adding the expandable phenolic resin-coated beads to a mold and then foaming and hardening the expandable phenolic resin-coated beads by heating.

13. The process for molding according to claim 12 wherein said expandable resin-coated composite beads are added to the mold in a bulk volume of 20 to 100%.

14. The process for molding according to claim 12 wherein said heating is performed at a temperature of 120° to 200° C.

15. A phenolic resin composite cellular molding molded according to the process of claim 12.

16. A process for molding a face plate-laminated phenol resin composite cellular molding which comprises coating an aggregate with a solid expandable resin composition comprising a solid, phenolic resin initial condensation product and a foaming agent to form expandable phenolic resin-coated composite beads, inserting a face plate in a mold, adding the expandable phenolic resin-coated composite beads therein and, foaming and hardening the expandable phenolic resin-coated beads by heating while adhesing them to the face plate.

17. The process for molding according to claim 16 wherein said face plate is a plate-like, net-like, nonwoven cloth-like, woven cloth-like, sheet-like or film-like material.

18. The process for molding according to claim 16 wherein said face plate is selected from metals, inorganic materials, wood and synthetic resins.

19. A face plate-laminated phenolic resin composite cellular molding molded according to the process of claim 16.

* * * * *